United States Patent [19]

Slater

[11] Patent Number: 4,580,689
[45] Date of Patent: Apr. 8, 1986

[54] ELECTRICAL OUTLET BOX WITH INTEGRAL SCREW ALIGNING, ENGAGING AND RETAINING BOSS

[75] Inventor: William E. Slater, South Bend, Ind.

[73] Assignee: Harvey Hubbell Incorporated, Orange, Conn.

[21] Appl. No.: 616,201

[22] Filed: Jun. 1, 1984

[51] Int. Cl.[4] .............................................. F16B 39/00
[52] U.S. Cl. ..................................... 220/3.2; 220/3.4; 220/3.5
[58] Field of Search ................... 220/3.2, 3.3, 3.4, 3.5, 220/3.6, 3.7, 3.8, 3.9, 3.92, 3.94, 327, 328

[56] References Cited

U.S. PATENT DOCUMENTS

| Re. 29,752 | 9/1978 | Jaconette, Jr. ................... 339/14 R |
| 2,775,916 | 1/1957 | Baxter et al. ........................ 85/32 |
| 2,867,349 | 1/1959 | Parker, Jr. ........................... 220/3.3 |
| 3,263,949 | 8/1966 | Conrad .................................. 248/74 |
| 3,740,451 | 6/1973 | Schindler et al. ............... 220/3.2 X |
| 3,876,821 | 4/1975 | Pringle ................................... 174/53 |
| 3,952,475 | 4/1976 | Paskert ............................ 220/3.4 X |
| 3,967,049 | 6/1976 | Brandt .................................... 174/53 |
| 4,025,144 | 5/1977 | Thibeault ......................... 339/133 R |
| 4,069,448 | 1/1978 | Gernhardt ............................ 220/3.2 |
| 4,130,335 | 12/1978 | Kinney .............................. 339/122 R |
| 4,214,667 | 7/1980 | Lass .................................. 220/3.5 X |
| 4,295,003 | 10/1981 | Borja et al. ........................... 174/53 |
| 4,315,100 | 2/1982 | Haslbeck et al. ................ 220/3.2 X |
| 4,355,198 | 10/1982 | Gartland, Jr. ......................... 174/66 |
| 4,424,405 | 1/1984 | Nattel .............................. 220/3.2 X |

FOREIGN PATENT DOCUMENTS 872839 7/1961 United Kingdom .

Primary Examiner—Steven M. Pollard
Attorney, Agent, or Firm—Jerry M. Presson; Alfred N. Goodman; Darle M. Short

[57] ABSTRACT

An electrical outlet box formed of nonmetallic material which has a pair of integral bosses that angularly align, engage and retain wiring device mounting screws therein. The bosses each have a through bore for receiving the screws comprising in sequence a frustoconical surface, a first cylindrical surface having a diameter slightly larger than the crest diameter of the mounting screw threads, and a second cylindrical surface having a diameter slightly smaller than the crest diameter of the screw threads and slightly larger than the root diameter of the screw threads. The frustoconical and two cylindrical surfaces are coaxial, with the frustoconical and first cylindrical surfaces angularly aligning the screw substantially coaxially of the bore and engaging the screw to resist inadvertent removal of the screw from the bore, and the second cylindrical surface threadedly retaining the screw therein upon rotation of the screw along that surface. An annular shoulder is defined at the interface of the first and second cylindrical surfaces.

3 Claims, 7 Drawing Figures

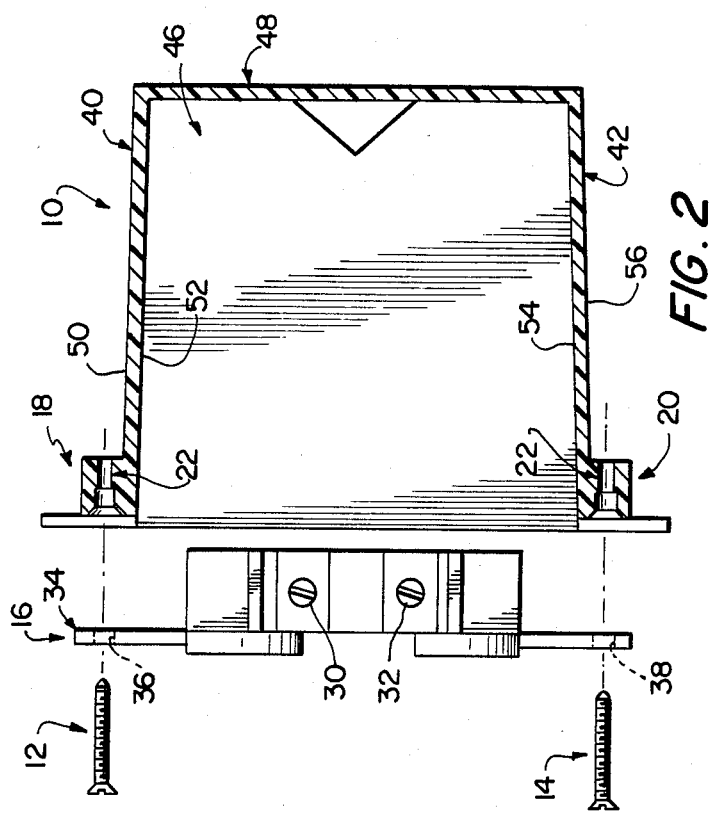
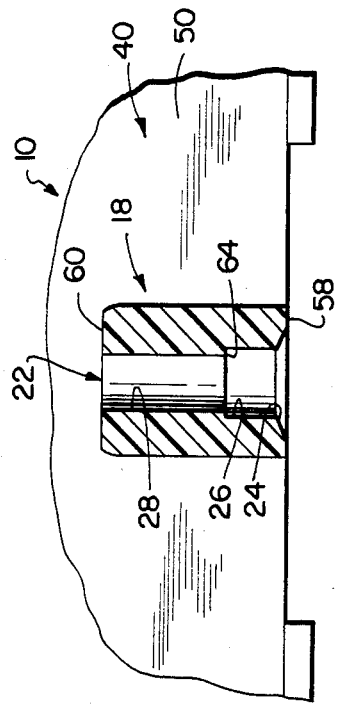
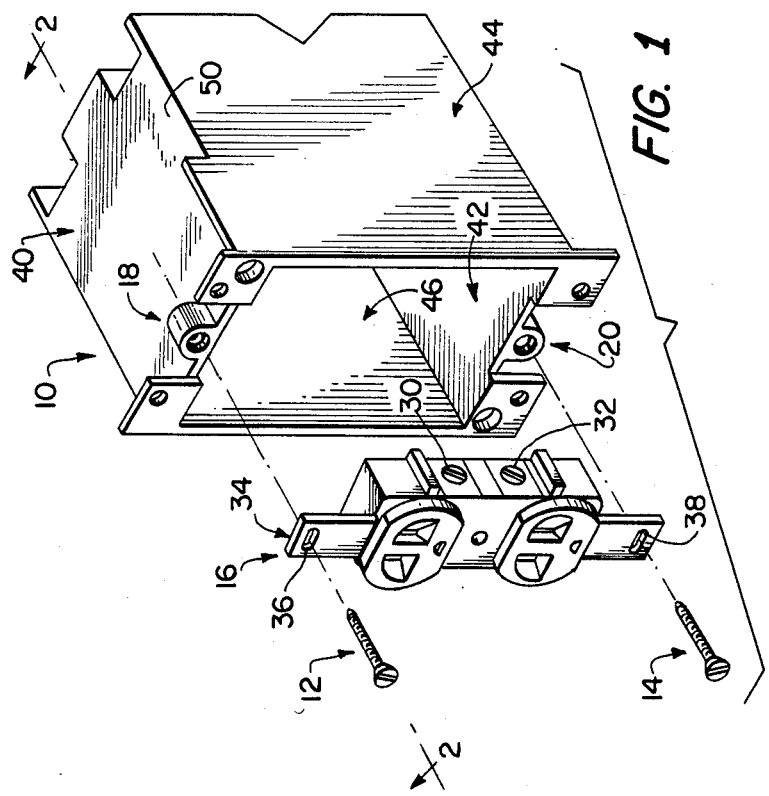
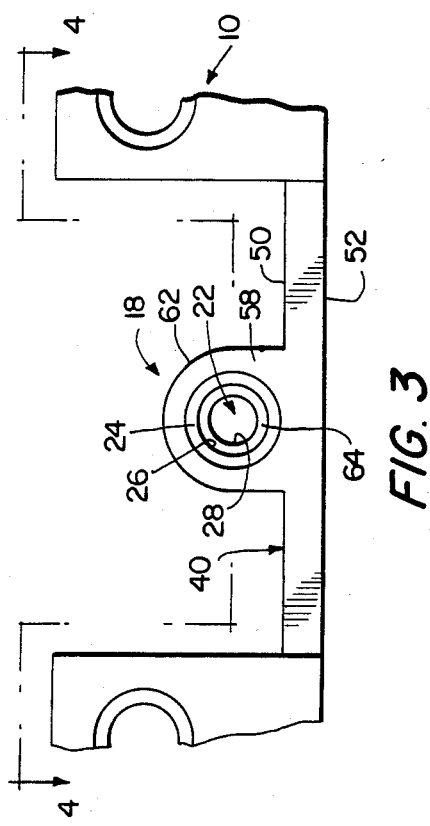

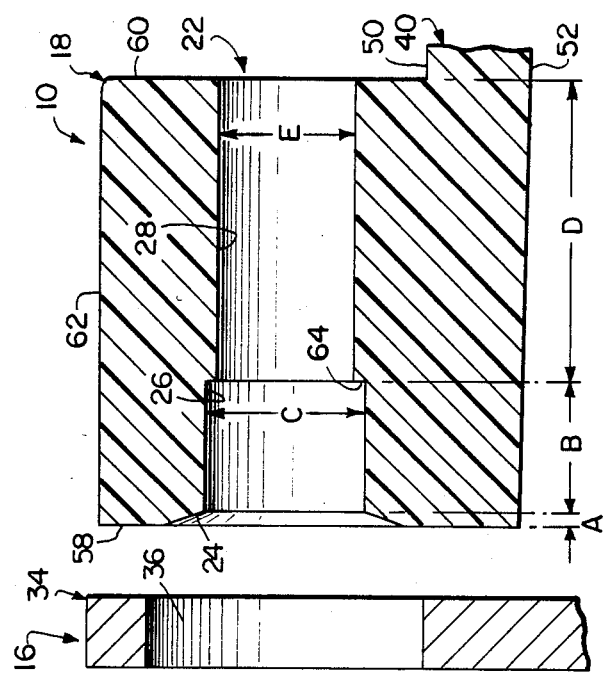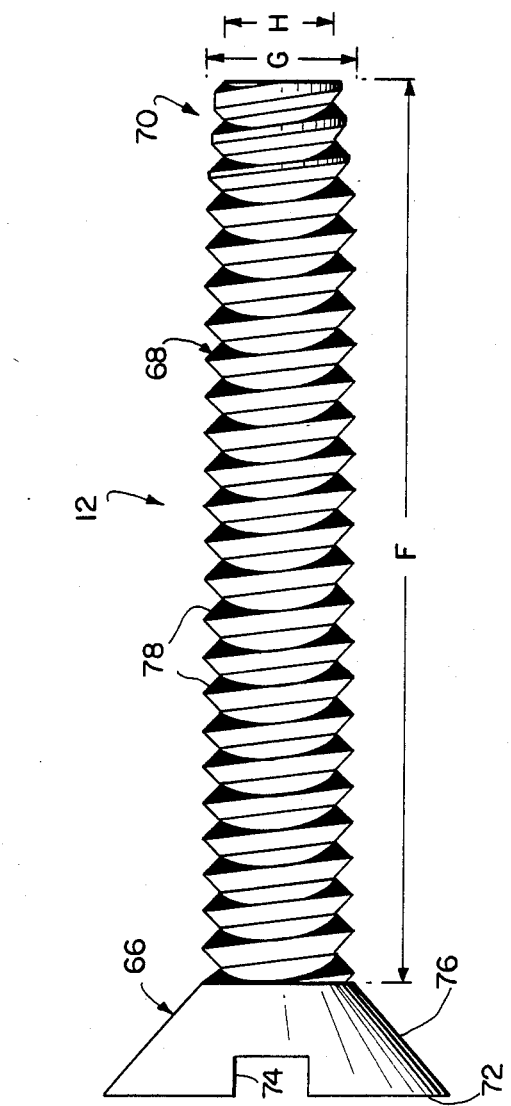
FIG. 5

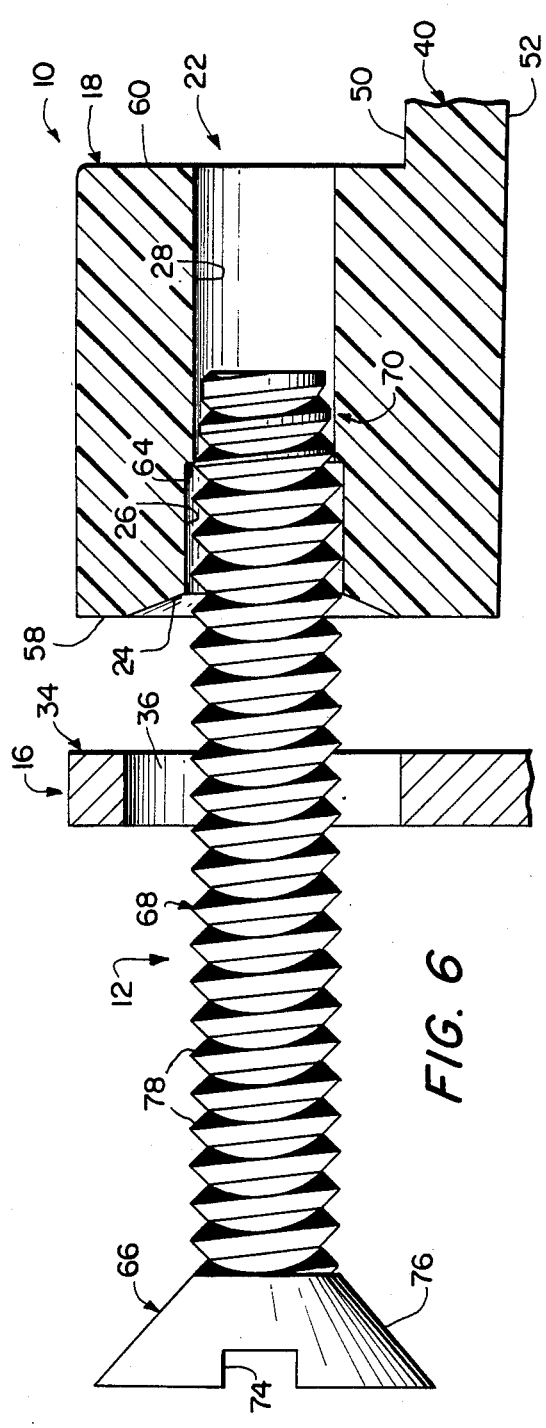
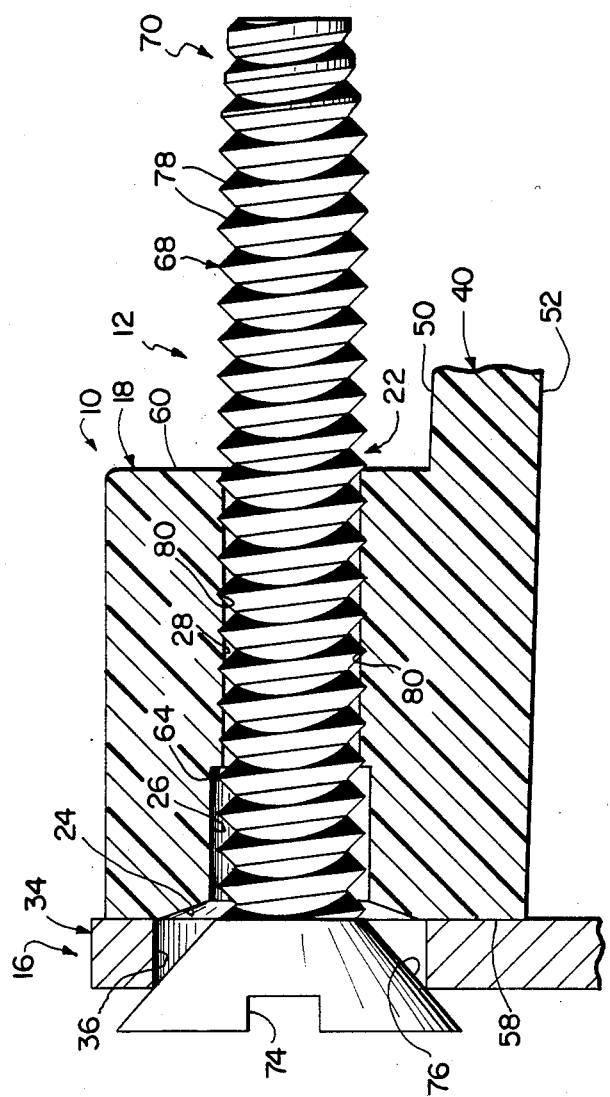
FIG. 6
FIG. 7

1

ELECTRICAL OUTLET BOX WITH INTEGRAL SCREW ALIGNING, ENGAGING AND RETAINING BOSS

FIELD OF THE INVENTION

The invention relates to an electrical outlet or wiring box formed of nonmetallic material which has a pair of integral bosses that align, engage and retain the mounting screws for wiring devices, electrical fixtures, covers and the like. The bosses each have a through bore comprising in sequence a frustoconical surface, a first cylindrical surface having a diameter slightly larger than the crest diameter of the mounting screw threads, and a second cylindrical surface having a diameter slightly smaller than the crest diameter of the screw threads and slightly larger than the root diameter of the screw threads.

BACKGROUND OF THE INVENTION

To conveniently support an electrical wiring device, such as a switch or a receptacle, an electrical lighting fixture, or simply a cover plate, an electrical outlet, or wiring, box is mounted in an opening made in a wall or ceiling and the electrical apparatus or cover plate is fastened to the box by means of two mounting screws. Conventional electrical outlet boxes are stamped from metal and typically have threaded earholes at the top and bottom for receiving and threadedly engaging the mounting screws. More recently, these boxes are made from nonmetallic materials, such as thermoplastic compositions, and various spring clips or other extra inserts are used to fasten the mounting screws to the electrical box as the screw passes through a bore formed in each of the box bosses. The longitudinal axis of the bore is substantially perpendicular to the face of the boss. Such bosses include an internal bore which cooperates with the structure of the clip to mount the clip fixedly in the boss.

However, the spring clips used for holding mounting screws in nonmetallic boxes have serious disadvantages. For example, the use of clips presents additional inventory which must be accounted for and ultimately increases the cost of manufacturing the electrical box as well as the chance of losing a necessary part. Moreover, the integral bosses sometimes do not adequately hold the mounting screw to the box, and in other cases, the clips may break under screw loading. In addition, these prior art clips do not significantly serve to angularly align the screw with the mounting bore. Thus, the screw may not easily thread straight into the mounting bore when it is rotated. The screwdriver can slide out of the slot in the screw head because there is no means for holding the screw firmly and therefore, it is free to move from side to side.

Examples of these prior art devices regarding outlet boxes as well as other screw retaining assemblies are disclosed in the following U.S. Pats. U.S. Pat. No. Re. 29,752 to Jaconette, Jr.; U.S. Pat. No. 3,263,949 to Conrad; U.S. Pat. No. 3,876,821 to Pringle; U.S. Pat. No. 3,967,049 to Brandt; U.S. Pat. No. 4,025,144 to Thibeault; U.S. Pat. No. 4,130,335 to Kinney; U.S. Pat. No. 4,295,003 to Borja et al; and U.S. Pat. No. 4,355,198 to Gartland, Jr.

Accordingly, there is a continuing need for improvement in rapidly, easily and economically mounting various types of electrical devices or covers to nonmetallic outlet boxes.

SUMMARY OF THE INVENTION

Accordingly, a primary object of the invention is to provide a nonmetallic electrical outlet box having an integral screw aligning, engaging and retaining boss which requires no extra pieces to secure a mounting screw thereto, thereby decreasing the cost of manufacture, the amount of inventory control needed, and the chance of losing parts thereof.

Another object of the invention is to provide a nonmetallic electrical outlet box that provides a secure installation of a wiring device, fixture, cover plate and the like by means of a strong and durable connection between the mounting screw and the outlet box.

Another object of the invention is to provide a nonmetallic outlet box that allows a faster and easier mounting screw installation by reducing the chances of the screw dropping out of the outlet box upon installation.

A further object of the invention is to provide such an outlet box that allows a straight threading of the screw into the box and frees the installer's hands from engaging the screw and the device which is to be mounted on the box.

The foregoing objects are basically attained by providing a nonmetallic outlet box for supporting an electrical wiring device via a threaded screw, the screw threads having a crest diameter and a root diameter, the combination comprising a boss integrally formed with the box and having a front face and a straight bore extending inwardly of the boss from the front face for receiving the screw, this bore comprising in sequence from the front face, an aligning and engaging mechanism for angularly aligning the screw substantially coaxially of the bore and engaging the screw to resist inadvertent removal of the screw from the bore, this aligning and engaging mechanism having a smallest diameter at least substantially equal to the crest diameter of the screw threads, and a retaining mechanism for retaining the screw in the boss substantially coaxially of the bore and for preventing removal of the screw therefrom by application only of an axial force.

In particular, the aligning and engaging mechanism comprises a frustoconical surface and a first substantially cylindrical surface and the retaining mechanism comprises a second substantially cylindrical surface having a diameter slightly smaller than the crest diameter of the screw threads and slightly larger than the root diameter of the screw threads, this retaining mechanism threadedly retaining the screw therein upon rotation of the screw into the retaining mechanism.

Other objects, advantages and salient features of the invention will become apparent from the following detailed description, which, taken in conjunction with the annexed drawings, discloses a preferred embodiment of the invention.

DRAWINGS

Referring now to the drawings which form a part of this original disclosure:

FIG. 1 is an exploded right perspective view of the outlet box in accordance with the present invention as well as a wiring device and a pair of mounting screws therefor;

FIG. 2 is an exploded, side elevational view in longitudinal section taken along line 2—2 in FIG. 1 showing the box, the wiring device, and the two mounting screws;

FIG. 3 is an enlarged, partial front elevational view of the box shown in FIGS. 1 and 2 and in particular showing the upper boss located on the top of the box for receiving the upper mounting screw;

FIG. 4 is a top plan view in section taken along lines 4—4 in FIG. 3 showing the through bore in the upper boss;

FIG. 5 is an enlarged, exploded side elevational view in longitudinal section, substantially to scale, showing the details of the mounting screw, wiring device mounting strap and boss as seen in FIG. 2;

FIG. 6 is a side elevational view in longitudinal section similar to that shown in FIG. 5 except that the mounting screw has been received initially in the through bore in the boss, angularly aligned substantially coaxially therewith and engaged thereby to resist inadvertent removal of the screw from the bore; and FIG. 7 is a side elevational view in longitudinal section similar to that shown in FIG. 6 except that the mounting screw has been rotated relative to the boss and is now fully threadedly engaged with the boss, thereby coupling the mounting strap on the wiring device to the boss.

DETAILED DESCRIPTION OF THE INVENTION

As seen in FIGS. 1 and 2, the electrical outlet, or wiring, box 10 in accordance with the invention is intended to be received in an opening in a wall and have rigidly mounted thereto via upper and lower mounting screws 12 and 14 a wiring device 16, which is shown as being an outlet, or receptacle, although such a wiring device could be a switch. As seen in FIGS. 1-7, the outlet box 10 has upper and lower bosses 18 and 20 integrally formed thereon for aligning, engaging and retaining the mounting screws therein. As described in more detail hereinafter, each boss has a through bore 22 therein which comprises a frustoconical surface, a first substantially cylindrical surface and a second substantially cylindrical surface in sequence, which in combination align, engage and retain the screw therein.

Referring now to FIGS. 1 and 2, the outlet box 10 is formed as a one-piece, unitary integrally molded member from a suitable nonmetallic material, such as a thermoplastic or thermoset composition. An example of such a thermoplastic material is polyvinylchloride, whereas an example of such a thermoset material is a phenolic resin. The box is conventionally mounted on a support which may be a floor or wall portion of a structure. The box may also be designed to mount a ceiling lighting fixture or other device to a ceiling support. The rear of the outlet box has a plurality of openings, not shown, for receiving electrical wires therethrough, these wires entering the box for electrical connection to, for example, a conventional wiring device 16 or an electrical fixture.

The wiring device 16, which is shown as a dual receptacle, has a pair of terminals 30 and 32 thereon for connection with the electrical wires and in addition has a mounting strap 34 which is advantageously formed of metal and has an upper elongated aperture 36 near the top and a lower elongated aperture 38 near the bottom. These apertures align with bosses 18 and 20 in the outlet box 10 and receive the mounting screws 12 and 14 therein to rigidly couple the wiring device to the box. As is evident from FIG. 7, the apertures in the mounting strap are large enough in the vertical direction to receive the shank of the screw but are smaller than the head of the screw.

As seen in FIGS. 1 and 2, the outlet box 10 is generally in the form of a parallelopiped with an open front for receiving the wiring device 16 and thus includes integrally formed top wall 40, bottom wall 42, right side wall 44, left side wall 46 and rear wall 48. As seen in FIGS. 2-7, the top wall 40 has an upper surface 50 and a lower surface 52, and similarly the bottom wall 42 has an upper surface 54 and a lower surface 56. As seen in FIGS. 1-4, the upper boss 18 extends outwardly from the upper surface 50 on the top wall 40 while the lower boss 20 extends outwardly from the lower surface 56 on the bottom wall 42.

The upper and lower bosses 18 and 20 are mirror images so only the upper boss 18 will be described in detail. Thus, the upper boss 18 has a overall length of about 0.375 inch and a width of about 0.328 inch. It has, as seen in FIGS. 3-5, a planar and vertical front face 58, a planar and vertical rear face 60, and an outer surface 62 which is arcuate on the top, being substantially semicylindrical, and planar on the opposed sides. These planar sides extend substantially tangentially to the semicylindrical portion of the outer surface. The through bore 22 is straight and extends completely through the boss from the front face 58 to the rear face 60.

As mentioned above, and as best seen in FIGS. 3-5, the through bore 22 comprises in sequence a frustoconical surface 24 extending inwardly from the front face 58 of the boss, a first substantially cylindrical surface 26 extending from the frustoconical surface, and a second substantially cylindrical surface 28 extending from the first cylindrical surface to the rear face 60 of the boss.

The frustoconical surface 24 and the first cylindrical surface 26 form an aligning and engaging portion in the boss that is essentially a pocket for guiding and angularly aligning the mounting screw substantially coaxially with the through bore and substantially in its center and for engaging the screw, upon its initial insertion therein, to resist inadvertent removal of the screw. The second cylindrical surface 28 is a screw retaining portion which is self tapping via the threads on the mounting screw 12.

The frustoconical surface 24 includes about 145° and has an axial length A of about 0.015 inch. The frustoconical surface tapers inwardly from its largest diameter of about 0.230 inch on the front face 58 to its smallest diameter of about 0.140±0.002 inch at its interface with the first cylindrical surface 26.

The first cylindrical surface 26 is coaxial with the frustoconical surface and has an axial length B equal to about 0.110 inch and a diameter C of about 0.140 inch ±0.002 inch, or more preferably merely +0.002 inch. Advantageously, the axial length of the frustoconical surface and the first cylindrical surface is about 16.667 percent of the overall length F of the screw shank as seen in FIG. 5, and equals about 0.125 inch.

The second substantially cylindrical surface 28 is coaxial with the frustoconical surface and the first cylindrical surface and has an axial length D of about 0.250 inch and a diameter E of about 0.118 inch ±0.002 inch. Defined at the interface between the first and second cylindrical surfaces is an annular shoulder 64 which lies in a plane substantially parallel to the front face 58 of the boss and therefore perpendicular to the longitudinal axes of the through bore 22, the frustoconical surface and the first and second cylindrical surfaces. The radial width of this annular shoulder is about 0.011 inch ±0.002 inch.

As seen in FIG. 5, the mounting screw 12 is shown comprising a head 66 and a threaded shank 68 integrally formed therewith and having a tapered tip 70. The head 66 has a flat circular outer surface 72 interrupted by a diametric slot 74 for receiving a screwdriver and a frustoconical inner surface 76 extending into the shank. The shank 68 is substantially uniform in configuration except for the tapered tip 70, and has an axial length F of about 0.75 inch with the crest diameter G of the screw threads 78 being about 0.138 inch and the root diameter H thereof being about 0.0997 inch. This 0.138 inch crest diameter is a maximum, with the diameter possibly being as small as 0.132 inch due to manufacturing tolerances.

As illustrated in FIGS. 5–7, the mounting screw 12 is in a form substantially duplicating to scale a No. 6/32 screw which has 32 threads per inch and a crest diameter of about 0.138 inch and a root diameter of about 0.0997 inch. This is the standard screw typically used in the industry for mounting wiring devices to outlet boxes.

As is evident from the dimensions discussed above, the first substantially cylindrical surface 28 has a diameter C that is generally slightly larger than the crest diameter G of the screw threads 78. In particular, this slightly larger diameter is about 0.002 inch ±0.002 inch. Since it is advantageous to prevent an interference fit between the screw and the first cylindrical surface, i.e., a 0.138 inch screw thread and a 0.138 inch or less surface, the tolerance on the first cylindrical surface is preferably only +0.002 inch. The second substantially cylindrical surface 28 has a diameter E slightly smaller than the crest diameter G of the screw threads, which difference in particular equals an amount of about 0.020 inch ±0.002 inch. In addition, the diameter E of the second cylindrical surface 28 is slightly larger than the root diameter H of the screw threads, which difference in particular is about 0.0183±0.002 inch larger. Thus, the shank 68 of the mounting screw can be received in the first cylindrical surface 26 with a clearance of about 0.001±0.001 inch therebetween around the circumference of the threads. Similarly, once the threads are manuevered into the second cylindrical surface 28, these threads self tap the cylindrical surface forming internal threads therein. This threadedly retains the screw in the second cylindrical surface and prevents removal thereof by application only of an axial force. As seen in FIG. 7, these internal, tapped threads formed in cylindrical surface 28 are designated 80.

OPERATION

To connect the wiring device 16 to the outlet box 10, the wiring device is moved adjacent to the box so that the apertures 36 and 38 in the mounting strap 34 are substantially aligned with the through bores 22 in the upper and lower bosses 18 and 20. Typically, the mounting screws 12 and 14 are loosely connected to the mounting straps in the apertures by means of small rectangular paper washers, not shown, so when the wiring device is placed adjacent the bosses, the mounting screws can be inserted into the through bores in the bosses, as seen in FIG. 6, without falling out of the wiring device.

This insertion traverses the frustoconical surface 24, which centers the shank 68 of the screw, and then the first cylindrical surface 26, which further centers the screws coaxially with the through bore and angularly aligns the shank substantially coaxially of the through bore. Moreover, insertion of the screw into the first cylindrical surface results in an engagement of the screw by this surface, its interface with the frustoconical surface and its interface with the second cylindrical surface, thereby resisting inadvertent removal of the screw and allowing the installer to release the screw and wiring device. Further insertion of the screw causes the tapered tip 70 of the shank 68 to traverse a portion of the second cylindrical surface 28 until the crests of the threads on the shank spaced from the tapered tip engage the annular shoulder 64. In this position shown in FIG. 6, the screw is substantially centered and aligned with the through bore and actually remains in the through bore after the screw is pushed therein due to, in addition to engagement by the first cylindrical surface, a slight deformation of the inner section of the annular shoulder. Hence, the screw tends to remain in the through bore and also tends to remain coaxially aligned therewith so that it can be screwed into the second cylindrical surface coaxially aligned therewith and thus avoid an undesirable offset angle. It is highly advantageous to avoid such an offset angle since this may provide unequal thread depth in the threads 80 formed in cylindrical surface 28, thereby reducing the pull-out strength of the screw connection which must be maintained to specific standards.

After the screw is initially inserted into the bore, the screw 12 is then rotated via, for example, a screwdriver received in slot 74 in the head of the screw, with this rotation causing the threads 78 on the screw to deform radially outwardly the second cylindrical surface 28 and thereby self tap helical threads 80 in that surface. This rotation, and resulting axial progression, of the screw into the second cylindrical surface is continued as seen in FIG. 7 until the frustoconical surface 76 on the head engages the mounting strap 34 adjacent the upper and lower edges of aperture 36 and the mounting strap 34 engages the front face 58 of the boss 18. In this position, the shank 68 of the screw extends out of the rear face 60 of the boss. Since the shank 68 of the screw is threadedly engaged with the second cylindrical surface via its threads 78 and the tapped threads 80, application only of an axial force tending to move the screw out of the boss will not remove the screw. Rather, to remove the screw a counter rotation must be provided to the screw and thus the second cylindrical surface 28 provides a very secure coupling of the screw to the boss and therefore the wiring device to the box.

Moreover, since the frustoconical surface and first cylindrical surface extend axially about 16.667 percent of the length of the screw shank, a significant aligning capability is provided. In addition, since the second cylindrical surface 28 has an axial length of about 66.667 percent of the overall length of the boss, and about twice the length of the first cylindrical surface, the second cylindrical surface provides a significant coupling action to the screw, thereby providing a very durable connection of the wiring device to the box.

Regarding alignment of the screw substantially coaxially of the bore upon initial insertion of the screw into the bore, it can be calculated, using a radial tolerance of 0.001 inch between the screw and cylindrical surface 26 and a length of 0.110 inch for surface 26, that the maximum angular misalignment of the screw relative to the axis of the bore 22 is about 0.5°, i.e., an angle whose tangent is 0.001 divided by 0.110. Thus, the angular misalignment is quite small, thereby producing self tapped threads 80 of substantially equal depth resulting in maximum pull-out strength of the screw relative to the boss.

As is evident, if the wiring device and wiring box are larger or heavier, such as those used in ceilings, the screw size can also be increased to, for example, a No. 8/32 screw, with a concomitant increase in the sizes of the frustoconical and cylindrical surfaces in the bore of the boss.

While one advantageous embodiment has been chosen to illustrate the invention, it will be understood by those skilled in the art that various changes and modifications can be made therein without departing from the scope of the invention as defined in the appended claims.

What is claimed is:

1. A nonmetallic box for supporting a device via a threaded screw, the screw threads having a crest diameter and a root diameter, the combination comprising:

a boss integrally formed with the box and having a planar front face and a straight bore extending inwardly of said boss from said front face and substantially perpendicularly to said front face for receiving the screw, said bore comprising in sequence from said front face aligning and engaging means for angularly aligning the screw substantially coaxially of said bore and engaging the screw to resist inadvertent removal of the screw from said bore, said aligning and engaging means comprising in sequence an inwardly tapering frustoconical section followed by a cylindrical portion, said frustoconical section having its largest diameter at said front face of said boss, said cylindrical portion having a diameter substantially equal to the crest diameter, and retaining means for retaining the screw in said boss substantially coaxially of said bore and for preventing removal of the screw therefrom by application only of an axial force, said retaining means comprising a single cylindrical surface having a diameter less than the crest diameter but greater than the root diameter, said retaining means being self-tapping and threadedly retaining the screw upon rotation of the screw in said retaining means, said frustoconical section, said cylindrical portion and said cylindrical surface being co-axial and integral.

2. A box according to claim 1 wherein
    said first and second cylindrical surfaces define a shoulder at the interface therebetween;
    said shoulder is annular and planar and lies in a plane substantially perpendicular to the axis of said retaining means.

3. A box according to claim 1 wherein
    said frustoconical section has an axial length of approximately 0.015 inch,
    said cylindrical portion has an axial length of approximately 0.110 inch, and
    said cylindrical surface has an axial length of approximately 0.250 inch.

* * * * *